Figure 1:
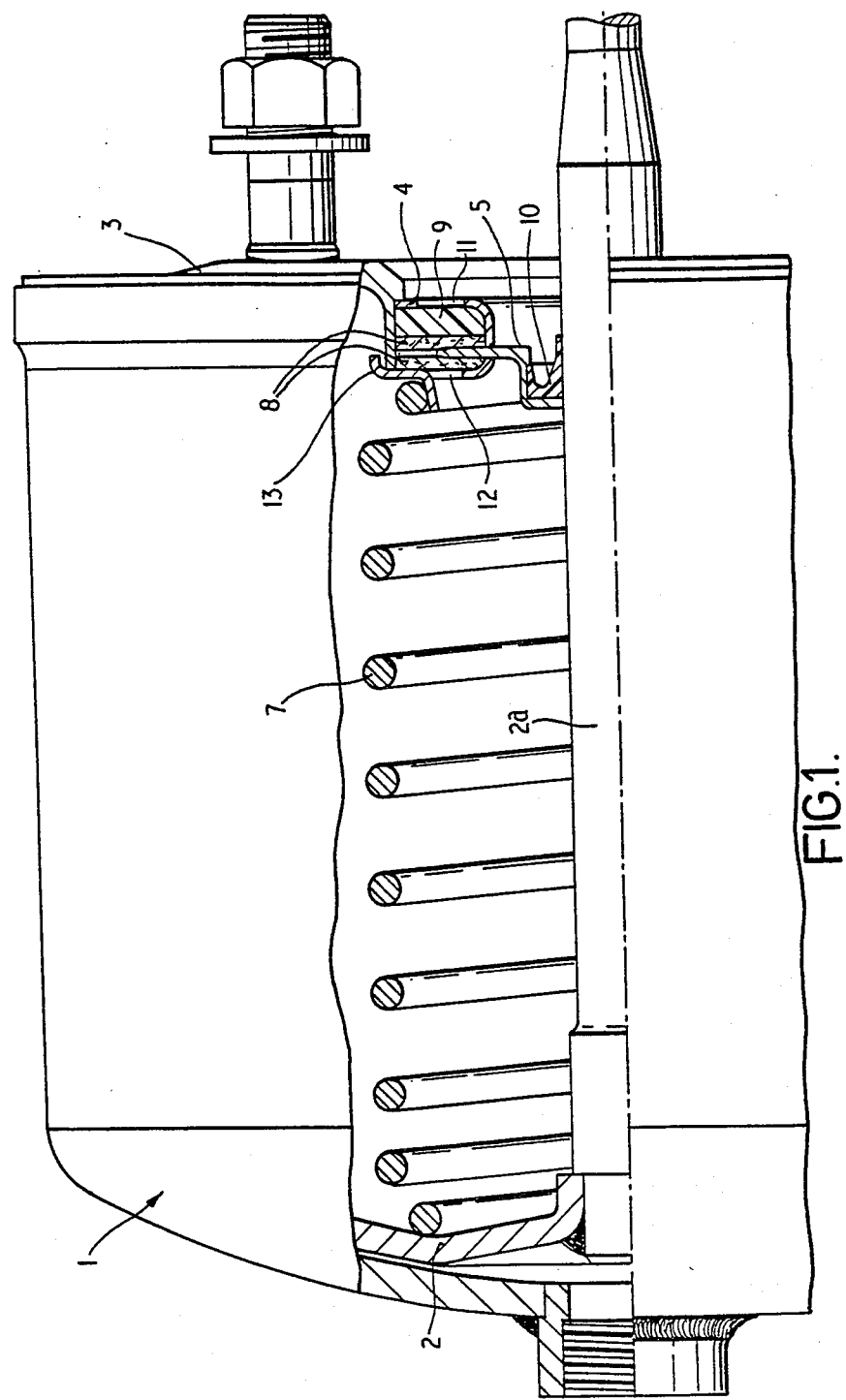

United States Patent [19]

Tregonning

[11] Patent Number: 4,461,486
[45] Date of Patent: Jul. 24, 1984

[54] PISTON ROD SCRAPER AND BREATHER ASSEMBLY

[75] Inventor: Geoffrey R. Tregonning, Chippenham, England

[73] Assignee: Westinghouse Brake and Signal Co. Ltd., Chippenham, England

[21] Appl. No.: 457,954

[22] Filed: Jan. 14, 1983

[30] Foreign Application Priority Data

Jan. 29, 1982 [GB] United Kingdom ............ 8202637

[51] Int. Cl.³ ........................................... F16J 15/32
[52] U.S. Cl. ........................................ 277/24; 277/30
[58] Field of Search .............. 277/1, 24, 30, 81 R, 277/193, DIG. 4

[56] References Cited

U.S. PATENT DOCUMENTS

| | | |
|---|---|---|
| 838,650 | 12/1906 | Rudd ............................ 277/24 |
| 2,307,152 | 1/1943 | Murray ......................... 277/24 |
| 2,473,139 | 6/1949 | Dickerman .................... 277/24 |
| 3,179,423 | 4/1965 | McCloud ....................... 277/30 |
| 3,203,511 | 8/1965 | Long ............................. 277/24 |
| 3,266,810 | 8/1966 | Reeser .......................... 277/24 |
| 3,953,037 | 4/1976 | Winfield ........................ 277/30 |
| 4,235,445 | 11/1980 | Lundholm ..................... 277/30 |
| 4,311,313 | 1/1982 | Vedova ......................... 277/30 |
| 4,353,558 | 10/1982 | Firth .............................. 277/30 |

*Primary Examiner*—Robert I. Smith
*Attorney, Agent, or Firm*—Larson and Taylor

[57] ABSTRACT

Scraper rings are known which are mounted in the back plate of a hydraulic cylinder to scrape a hydraulic piston rod. Known scrapers are not very suitable for applications where the piston rod is liable to movement and vibration e.g. in pneumatic pistons and cylinders. The present invention provides a shaft scraper ring arrangement in which the scraper ring is so supported so as to be movable, to a limited extent, in a plane transverse to the shaft or rod which is to be scraped. Cylinder 1 contains a piston 2 and a back plate 3. Supported centrally in the back plate 3 is a housing 4 which supports a plate 5 carrying a rod scraper 5a. Piston 2 is supported by a piston rod 2a which is scraped by the rod scraper. A seal 10 located on the rod scraper plate 5 bears against the rod 2a. Rod scraper plate 5 has limited freedom for movement in a plane transverse to the rod 2a. The plate 5 is loosely carried by the housing 4 being located between two felt oil retaining annular rings 8. Also within the housing is a reticulated polyurethane foam breather element 9.

10 Claims, 2 Drawing Figures

PISTON ROD SCRAPER AND BREATHER ASSEMBLY

This invention relates to shaft scraper rings, which are particularly useful as piston rod scraper rings and to the supporting and mounting arrangements for such rings integral with adequate but compact breather/filter arrangements for associated pneumatic cylinders. Known scraper rings, extremely efficient when mounted for example in the back plate of a hydraulic cylinder so as to scrape the rod which supports the piston of the hydraulic piston and cylinder arrangement, are not, when mounted in the usual rigid form of cylinder end-cap assembly, ideally effective in applications where the piston rod operates in circumstances involving appreciable lateral movement and vibration such as are particularly evident in certain types of pneumatic piston and cylinder installations. Railway brake cylinders for example require effective exclusion of dirt and foreign matter prevalent in a particularly harsh operating environment. Elastomeric boots shielding piston apertures tend to be bulky and prone to premature failure in service; they in any event necessitate some separate form of breathing arrangement so as not to pressurise and distort or burst the boot during operation.

An object of the present invention is to provide a shaft scraper ring arrangement in which the scraper ring is so supported as to be movable, to a limited extent, in a plane transverse to the shaft or rod which is to be scraped.

A further object is to provide a scraper ring arrangement suitable for use in a pneumatic piston and cylinder in which there is provision for the cylinder to breathe but at the same time dirt and foreign matter is excluded, and which may be wholly contained within the same space envelope as a simple flat ended cylinder not so equipped.

In accordance with the present invention a shaft scraper ring arrangement comprises a scraper ring or a supporting plate for the scraper ring which is supported with limited freedom of movement in a plane transverse to the shaft which is to be scraped, the ring or supporting plate being freely located between oil saturated support and filter pads in a housing assembly. Preferably the housing for the pads also contains a reticulated filter element, preferably in annular filter element. The pads are also preferably annular and may be of felt or any similar oil retaining material. Preferably a limited axial clearance is provided between the scraper support plate and flanges formed around piston rod clearance apertures in the housing members.

The housing assembly preferably has relatively small apertures on the side of the assembly adjacent the reticulated filter element and larger apertures on the opposite side of the assembly so that when used on a piston shaft the larger apertures will face into the cylinder behind the piston and the smaller apertures will be in direct communication with the atmosphere. With this arrangement the first movement of the piston will blow air out through the larger apertures at a relatively low velocity through the pads via the annular space between the scraper supporting plate and the main housing, through the reticulated filter element and out of the smaller apertures into the atmosphere. Accelerated to a relatively high velocity through the outermost apertures, the displaced air will tend to blow clear any diret or other foreign matter which may have lodged in or around them, thus inhibiting the build-up of any obstruction to free breathing of the cylinder.

The reticulated element is preferably in the form of a strip of reticulated polyurethane foam providing high permeability to air while being wetted throughout with a contaminant collecting film of lubricating oil.

A scraper ring may for example be employed in a railway brake pneumatic cylinder to scrape the piston rod, the housing assembly being mounted in the back plate of the cylinder.

Part of the housing assembly may also act as the spring locator for the spring which is normally used between the piston and the back plate of the cylinder.

Thus the shaft scraper ring arrangement acts as a spring locator, breather and shaft scraper with provision for radial movement of the scraper and the whole is retained in position by the piston return spring acting through the spring locator.

In the accompanying drawings FIG. 1 shows a railway brake pneumatic cylinder and piston arrangement in elevation with part of the housing cut-away and parts in section.

Figure 2:
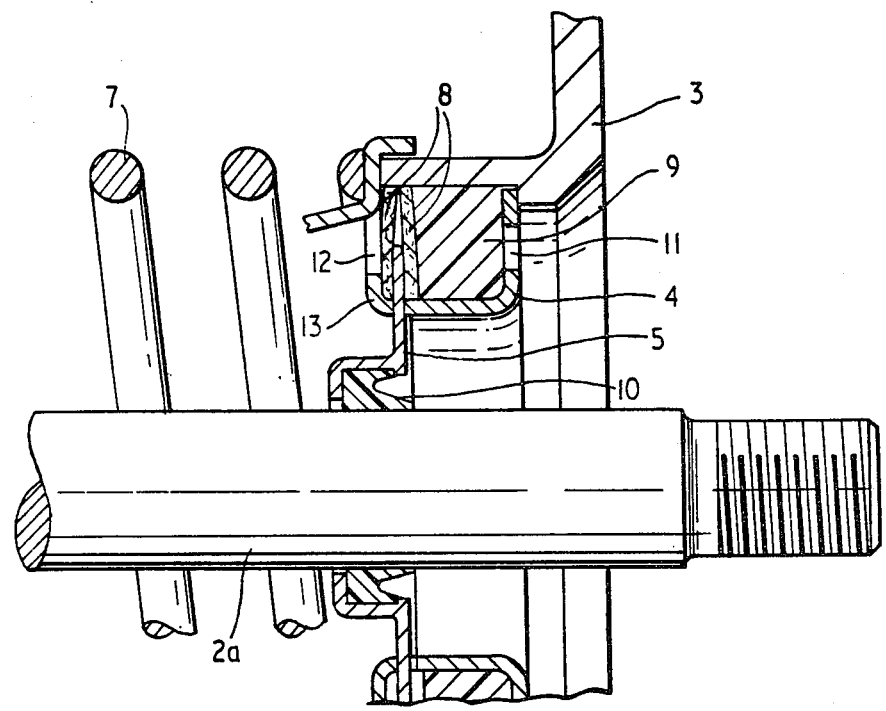

FIG. 2 is an enlarged section of part of FIG. 1.

The cylinder 1 contains a piston 2 and a back plate or cylinder end cover 3. Supported centrally in the back plate 3 is a housing 4 which locates axially a plate 5 carrying a well known and relatively inexpensive type of rod scraper ring 10. Piston 2 is supported by a piston rod 2a and it is this rod which is scraped by the rod scraper ring 10 which has a limited degree of resilience. The scraper housing plate 5 has limited, but relatively much greater, freedom for movement in a plane transverse to the rod 2a. The plate 5 is loosely carried between the housing 4 and the plate 13, being located slideably and resiliently between two felt oil retaining annular rings 8.

Within the housing 4 is a reticulated polyurethane foam breather element 9 which is in the form of a strip wound round into a circle. In the face of the housing 4 are formed small apertures 11 and in the face of plate 13 apertures 12 of larger area. The apertures 12 may be formed by punching so that tabs produced by this operation form an effective location on the retainer plate for the spring 7 which lies between the piston 2 and the back plate 3. A flange formed circumferentially on plate 13 locates plate 13, and hence spring 7, concentrically with back plate 3.

It will be seen that the scraper can move with limited freedom in radial direction so as to accommodate movements of the rod 2a. The apertures 11 and 12 together with the reticulated filter element 9 and the pads 8 allow the cylinder to breathe and because apertures 12 are larger than the apertures 11 dirt and other matter which may be lodged at apertures 11 is blown clear by the first movement of the piston, without undue restriction of displacement air-flow through the oiled felt parts 8 of the breather assembly.

Thus the whole assembly effectively prevents ingress of foreign matter while permitting free breathing together with adequate angular and radial movement of the piston rod. The spring 7 bearing on the inner plate 13 of the housing retains the assembly in slight compression and closed shut.

While the invention has particular application in relation to pneumatic brake cylinders it may be used in any circumstances where a scraper ring is required which can scrape a rod and the working lip of the ring is required to have a degree of freedom of movement in a plane transverse to the rod greater than that inherent in the limited resilience of the ring itself.

The whole assembly could be reversed with the scraper ring acting on the internal surface of the cylinder and the housing supported on a rod if the cylinder needed to be scraped.

Having thus described our invention what we claim is:

1. A shaft scraper ring arrangement comprising a scraper ring and a supporting plate for the scraper ring, and means to support said plate with limited freedom of movement in a plane transverse to a shaft which is to be scraped, the means to support said plate comprising oil saturated support and filter pads and a housing assembly, the plate being freely located between the pads in the housing assembly.

2. An arrangement according to claim 1 and in which the housing for the pads also contains a reticulated filter element.

3. An arrangement according to claim 2 and in which the filter element is an annular filter element.

4. An arrangement according to claim 1 and in which the pads are annular and made of oil retaining material.

5. An arrangement according to claim 1 and in which a limited axial clearance is provided between the scraper support plate and flanges formed arond piston rod clearance apertures in the housing assembly.

6. An arrangement according to claim 1 in which the housing has relatively small apertures on the side of the housing adjacent the reticulated filter element and larger apertures on the opposite side of the assembly so that when used on a piston shaft the larger apertures will face into the cylinder behind the piston and the smaller apertures will be in direct communication with the atmosphere, whereby the first movement of the piston will blow air out through the larger apertures at the relatively low velocity, through the pads via the annular space between the scraper supporting plate and the main housing, through reticulated filter element and out of the smaller apertures into the atmosphere.

7. An arrangement according to claim 1 and in which the reticulated element is in the form of a strip of reticulated polyurethane foam providing high permeability to air while being wetted throughout with a contaminant collecting film of lubricating oil.

8. A scraper ring arrangement according to claim 1 and including a railway brake pneumatic cylinder and piston rod, the housing being mounted in or on the back plate of the cylinder.

9. An arrangement according to claim 8 and including a spring and a cylinder back plate part of the housing assembly acting as a spring locator for said spring located between the piston and the back plate of the cylinder.

10. An arrangement according to claim 9 in which said spring is a piston return spring and the shaft scraper ring arrangement acts as a spring locator breather and shaft scraper with provision for radial movement of the scraper, and the whole is retained in position by the piston return spring acting through the spring locator.

* * * * *